United States Patent [19]

Erickson

[11] 4,209,145
[45] Jun. 24, 1980

[54] FAST FORWARD-REVERSE MECHANISM FOR CASSETTE TYPE TAPE RECORDER

[75] Inventor: Leif O. Erickson, Maplewood, Minn.

[73] Assignee: Minnesota Mining and Manufacturing Company, Saint Paul, Minn.

[21] Appl. No.: 2,344

[22] Filed: Jan. 10, 1979

[51] Int. Cl.² .......................... G03B 1/04; G11B 15/32
[52] U.S. Cl. ..................................... 242/204; 360/74.3
[58] Field of Search .............................. 242/201–204, 242/208, 67.4; 360/74.1, 74.2, 74.3, 74.5–74.7

[56] References Cited

U.S. PATENT DOCUMENTS

| | | | |
|---|---|---|---|
| 3,495,789 | 2/1970 | Gerfast | 242/201 |
| 3,532,293 | 10/1970 | Rose | 242/200 |
| 3,938,758 | 2/1976 | Totino | 242/201 |

Primary Examiner—Leonard D. Christian
Attorney, Agent, or Firm—Cruzan Alexander; Donald M. Sell; William B. Barte

[57] ABSTRACT

A cassette reel drive mechanism is disclosed for providing fast forward and reverse drive for the supply and takeup reels of the cassette. The mechanism includes a simple mechanism, all of which is desirably mounted on the shaft of a DC reversible motor, and utilizes a portion of the torque of the motor, coupled through a clutch mechanism, to pivot a linkage arm. An idler wheel is mounted on the arm and is driven by the motor. Pivoting of the arm brings the idler wheel into driving contact with a respective turntable associated with the supply and takeup spindles on which a cassette may be mounted to provide the desired fast forward or reverse drive, and disengages a brake mechanism to allow unencumbered rotation of the appropriate turntable.

9 Claims, 4 Drawing Figures

FAST FORWARD-REVERSE MECHANISM FOR CASSETTE TYPE TAPE RECORDER

BACKGROUND OF THE INVENTION

1. Field of the Invention

This invention relates to magnetic tape recorder drive mechanisms, particularly to those adapted for use with reel-to-reel tape cassettes.

2. Description of the Prior Art

Cassette type recorders are perhaps the most common and accepted format of magnetic tape recorders, particularly in the consumer or inexpensive recorder portion of the market area. Because of the desire to provide cassette recorders which are both light weight and relatively inexpensive, numerous different mechanisms have been developed for effecting rapid motion of either the supply or takeup reels of the cassettes, to provide fast forward or reverse searching operations.

Typically, cassette decks have evolved into two general categories, those having a single drive motor, from which rotary motion is coupled to a tape drive capstan and to the supply and takeup reel spindles, and those having multiple drive motors in which a separate motor is used to drive the tape drive capstan and an additional motor (or motors) is used to drive the supply and takeup reel spindles.

Recorder decks falling in the latter category have heretofore either used completely separate motors for driving the supply and takeup spindles respectively, or have utilized sundry mechanisms by which rotary motion from a single motor is alternately coupled to drive each spindle in the desired direction and in which braking mechanisms to appropriately inhibit spindle rotation are separately included. For example, U.S. Pat. No. 3,495,789 (Gerfast) discloses a web transport mechanism including a single motor which is coupled through a helix to a disc mounted between matching wheels. Depending upon the direction of rotation of the motor and the helix, the disc is driven into contact with one or the other of the wheels. Each wheel is coupled to a respective one of the supply or takeup reel spindles to provide the appropriate driving force. When rotation of the helix is stopped, the inertia of the disc causes it to move along the helix from a drive position against one of the wheels to a braking position against the other of the two wheels (Column 2, lines 26-39). While the mechanism thus eliminates separate braking members, the construction is undesirably complex and fails to provide braking action to both spindles so as to minimize slack in tape exposed between the two reels.

Another type of cassette deck utilizing separate motors for driving the capstan and the reel spindles is depicted in U.S. Pat. No. 3,532,293 (Rose). In that patent, a drive hub 26 coupled to a motor drive mechanism (not shown) is caused to be shifted into contact with the periphery of either turntable on which the respective spindles are positioned. The specific means for effecting the requisite motion is not there disclosed, and a separate braking device is depicted for impeding rotation of the turntables.

SUMMARY OF THE INVENTION

In contrast to the relatively complex assemblies discussed above, the recorder of the present invention includes an improved fast forward and reverse drive mechanism in which the entire mechanism comprises a single unitary assembly in which expensive or accurately toleranced components such as helix drives and separate braking assemblies are avoided. The recorder includes rotatable supply and takeup turntables having spindles thereon which are adapted to receive supply and takeup reels of a reel-to-reel magnetic tape cassette. The fast forward and reverse drive mechanism specifically comprises a drive shaft adapted for energization in either a clockwise or counterclockwise direction, onto which the remaining members are assembled. A first drive means, such as a drive wheel, is secured to the shaft for coupling rotary motion therefrom. A linkage means is pivotably mounted on the shaft, together with a clutch means, such that rotary motion of the shaft is coupled through the clutch means to the linkage means, while also allowing slippage of the linkage means when resistance to rotation thereof exceeds a predetermined value. A second drive means, such as an idler wheel, is rotatably mounted on the linkage means and has a peripheral surface which is in driven engagement with the first drive means. Further, a braking means is movably mounted for contacting the turntables to arrest motion thereof when in a first position and for withdrawal from the turntables to allow unencumbered rotation thereof when in a second position. The mechanism is positioned between the turntables of the recorder such that pivoting of the linkage means in either direction as a result of a given direction of rotation of the shaft, causes the second drive means to be coupled to either the supply or takeup turntable, thus imparting a rotary force thereto, and causes the braking means to be moved from the first position to the second position.

In a preferred embodiment, the mechanism further includes an electrically reversible motor, the shaft of which is coupled to, or may itself be, the drive shaft. Accordingly, all portions, except for the braking means, of the fast forward/reverse mechanism may be assembled on the motor shaft and mounted on the recorder deck solely by means of the motor mounting.

DESCRIPTION OF THE PREFERRED EMBODIMENT

Figure 1:
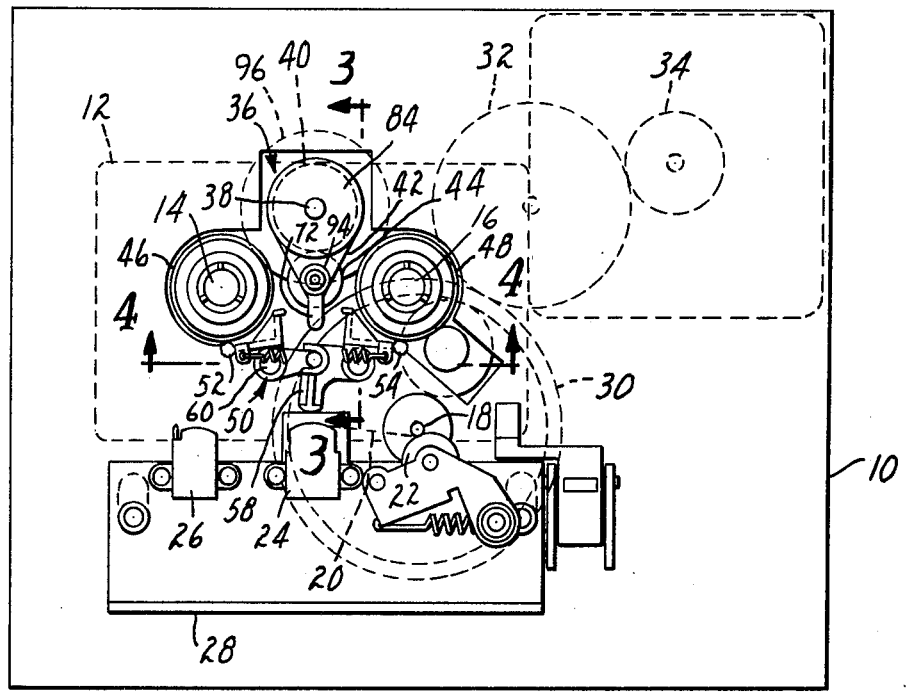
FIG. 1 is a top plane view of a preferred embodiment of the recorder drive mechanism of the present invention.

A preferred embodiment of the tape recorder drive mechanism of the present invention is set forth in FIG. 1. As may there be seen, the mechanism 10 is adapted to receive a cassette 12 on a supply spindle 14 and takeup spindle 16, respectively. A drive capstan 18 is thus positioned within the cassette 12 such that a tape 20 contained therewithin is driven between the capstan 18 and associated pressure roller 22. The roller 22 as well as a record and erase head 24 and 26, respectively, is in turn mounted on a slideable carriage 28, which may be withdrawn to allow the cassette 12 to be inserted. The capstan 18 is coaxial with a flywheel 30, which is in turn driven by an idler wheel 32 coupled to a capstan drive motor 34.

More specific to the present invention, a fast forward-/reverse drive mechanism 36 is shown in FIG. 1 to include a drive shaft 38 which is adapted to be driven by a drive motor (not shown) and to which is secured a first drive means, such as a drive wheel 40 having a peripheral surface adapted for frictional driving engagement. Also mounted on the drive shaft 38 is a linkage arm 42. A second drive means, such as another wheel 44 having a frictional drive periphery mounted on the linkage means 40 is positioned such that its periphery is in driven engagement with the periphery of the first drive wheel 40. These members of the mechanism 36 are in turn positioned between supply reel and takeup reel turntables 46 and 48, respectively, which turntables are coaxial with the respective spindles 14 and 16 so as to be engagable by the second drive wheel 44.

The recorder mechanism further includes a braking mechanism shown generally as 50, which is adapted to be movable from a first position shown in FIG. 1 at which the braking surfaces 52 and 54 are in engagement with turntables 46 and 48 so as to inhibit rotation thereof, into a second position, at which the braking surfaces 52 and 54 are withdrawn from the turntables, thereby allowing free rotation.

Figure 2:
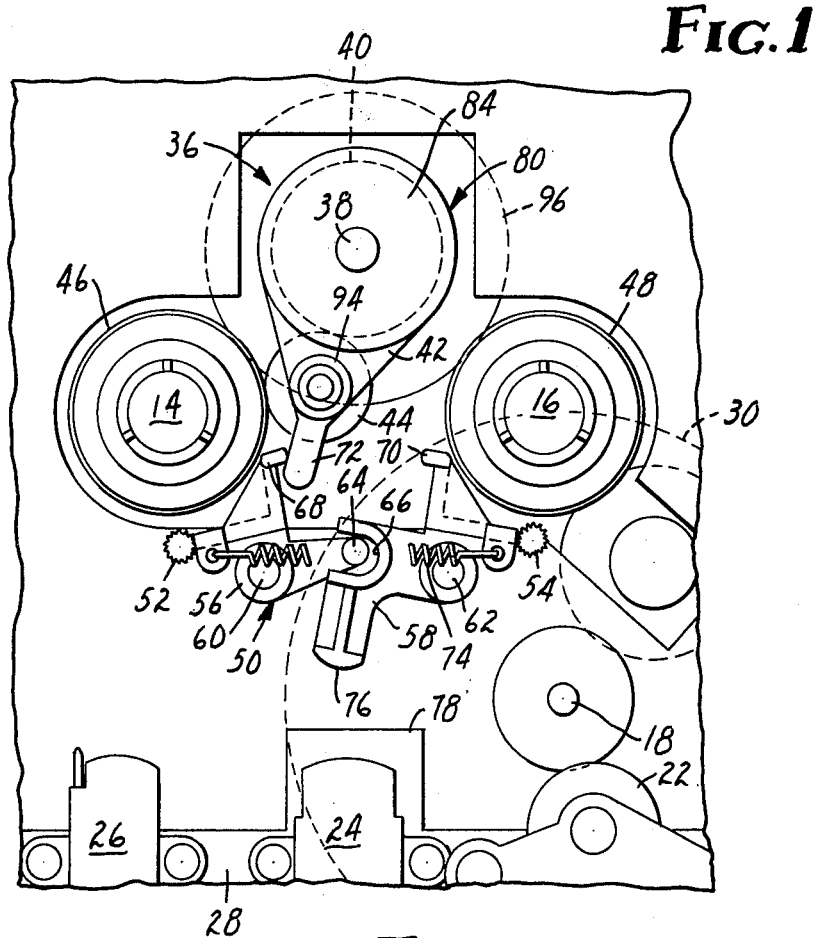
FIG. 2 is an enlarged, cutaway top view of the embodiment shown in FIG. 1.

As shown in more detail in FIG. 2, the braking mechanism 50 preferably includes two molded plastic members 56 and 58, each of which members are rotatably mounted on a respective post 60 and 62 projecting from the base of the recorder. The member 56 is provided with a projection 64 adapted to be received within a recess 66 of the second braking member 58, such that rotation of either member 56 or 58 causes rotation of the corresponding opposite member. This rotation is effected by means of extensions 68 and 70 on the members 56 and 58, respectively, which interact with an extension 72 on the linkage arm 42. As the linkage arm 42 is caused to rotate, the extension 72 bears against either of the projections 68 or 70, respectively, causing the withdrawal of the braking surfaces 52 and 54 away from the turntables 46 and 48, respectively. The rotation of the linkage arm 42 further causes the second drive wheel 44 to bear against one of the turntables 46 or 48, causing that member to be driven. Upon deenergization of the drive shaft 38, a spring 74 linked between the braking members 56 and 58 causes the members to force the linkage arm 42 toward the center position shown in FIG. 1 such that the braking portions 52 and 54 reengage the turntables and the second drive wheel 44 is withdrawn from the turntables.

During normal record or erase operations, withdrawal of the braking portions 52 and 54 is effected by means of a projection 76 on the second braking member 58. This projection is in turn adapted to be engaged by a tab 78 on the carriage 28 such that when the carriage is advanced to engage the roller 22 with the drive capstan 18, the brake members 56 and 58 are rotated as described above.

Figure 3:
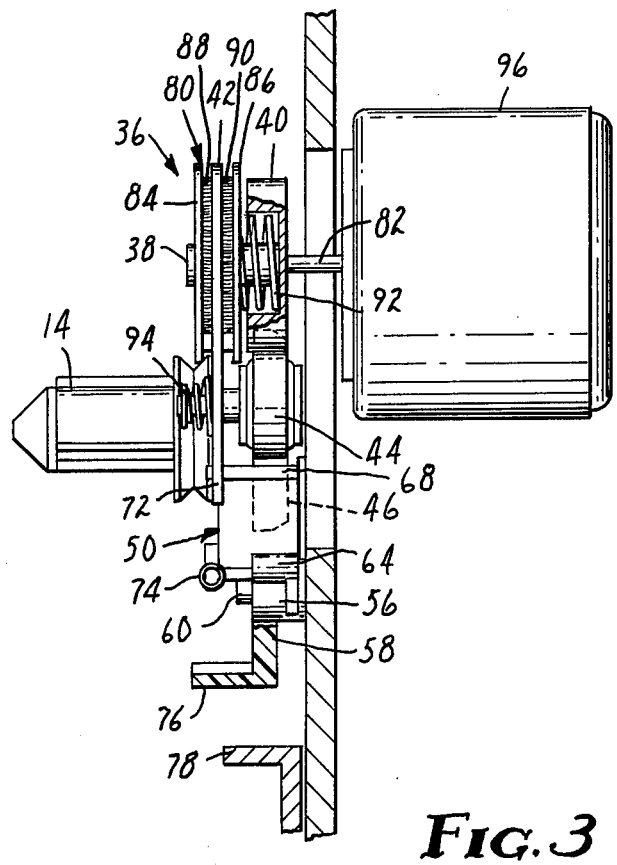
FIG. 3 is a partially cut away side view taken along the section line 3—3 shown in FIG. 1.

The controlled pivoting of the linkage arm 42 is shown in detail in FIG. 3 to be effected by means of a clutch mechanism 80, which is mounted concentric with the drive shaft 38. This clutch mechanism includes a support post 82 which is an extension of the first drive wheel 40 and secures that wheel to the shaft 38. Secured to the post 82 are upper and lower clutch plates 84 and 86, which plates are thus caused to rotate along with the post 82 and the drive shaft 38. The linkage arm 42 is in turn sandwiched between the upper and lower clutch plates 84 and 86, respectively, by resilient clutch pads 88 and 90, respectively. The composite clutch assembly is then biased together by means of a coil spring 92 which is mounted within a recess in the first drive wheel 40.

In order to provide sufficient torque to rotate the braking members 56 and 58, and to drive the appropriate turntable, as well as to stabilize the speed of the drive motor, the clutch mechanism is desirably designed to couple a significant portion of the available torque from the motor to the linkage member 42. For example, approximately 50% of the available torque is desirably so coupled. This feature thus allows the elimination of separate speed controls which are otherwise commonly required.

Rotation of the drive shaft 38 is effected by a conventional DC electrically reversible motor 96. Depending upon the polarity of potentials applied to the motor 96, the rotation of the shaft 38 may be controllably reversed, thus causing torque from the shaft 38 to be coupled through the clutch assembly 80 to the linkage arm 42. This coupling torque thus causes the arm 42 to rotate either clockwise or counterclockwise until further rotation is restrained due to the contact of the second drive wheel 44 with the appropriate turntable 46 or 48. Further shown in detail in FIG. 3 is the mounting of the second drive wheel 44 on the linkage arm 42, including a spring loaded mounting means 94.

Figure 4:
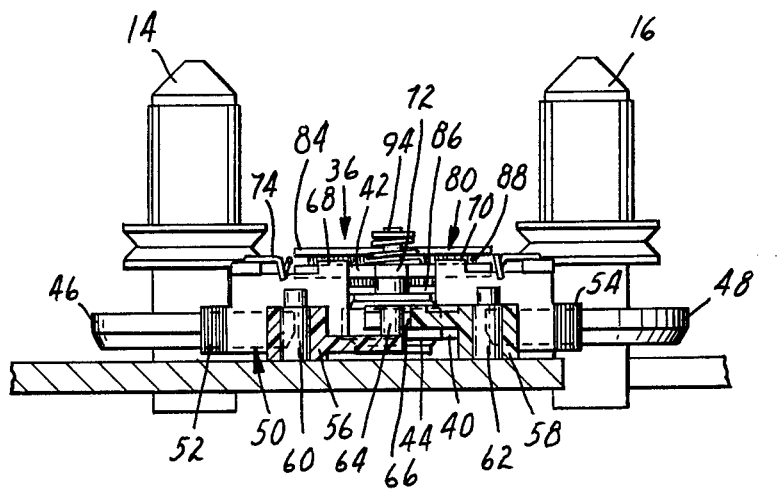
FIG. 4 is a partial side view taken along the section line 4—4 shown in FIG. 1.

The manner by which the braking members 56 and 58 interact is further shown in the side view of FIG. 4. As is there shown, the members 56 and 58 are rotatably mounted on posts 60 and 62 such that the braking portions 52 and 54 are controllably brought into contact with the periphery of the turntables 46 and 48. The manner by which the projection 64 of the first braking member 52 is coupled within the recess 66 of the second member 58 is further shown in that figure. Further, the projection 72 on the linkage arm 42 is there shown to be positioned between the extensions 68 and 70, respectively, on the braking members 56 and 58 so as to be activated upon rotation of the linkage arm.

In addition to the embodiment disclosed above in which the braking means are directly engaged by a projection on a linkage arm, it is also within the scope of the present invention to provide a linkage means which, acting through several separate components, also controls the braking action. For example, in one such embodiment, the linkage means may include a solenoid which is simultaneously energized along with a motor driving an appropriate spindle, which solenoid is coupled to release the braking means.

The components utilized in the above-described embodiments are constructed of conventional materials known to those skilled in the art. For example, the braking members 56 and 58 are desirably injection molded plastic components. Likewise, the clutch plates 84 and 86 utilized within the clutch assembly 80 are desirably formed of relatively long wearing material such as Delrin ®, an acetal polymer manufactured by E. I. duPont Corp., while the clutch pads 88 and 90 are desirably formed of a material having a relatively high coefficient of friction, such as cork, felt, or the like. Alternative constructions such as are readily evident to those skilled in the art are similarly within the scope of the present disclosure.

Having thus described the present invention, what is claimed is:

1. In a magnetic tape recorder of the type having rotatable supply and takeup turntables and spindles thereon adapted to receive supply and takeup reels of a reel-to-reel magnetic tape cassette, said recorder being conditionable for operation in fast forward and rewind modes, an improved fast-forward and reverse drive mechanism comprising:

a drive shaft adapted for energization in either a clockwise or counterclockwise direction, first drive means secured to said shaft for coupling rotary motion from said shaft, linkage means pivotably mounted on said shaft, clutch means mounted on said shaft for coupling rotary motion thereof to said linkage means and allowing slippage of said linkage means when resistance to rotation thereof exceeds a predetermined value, second drive means rotatably supported on said linkage means and having a peripheral surface in driven engagement with said first drive means, and braking means movably mounted for contacting said turntables to arrest motion thereof when in a first position and for withdrawal from said turntables to allow unencumbered rotation thereof when in a second position, said mechanism being positioned between said turntables such that pivoting of said linkage means in either direction as a result of a given direction of rotation of said shaft causes said second drive means to be coupled to either the supply or takeup turntable, thus imparting a rotary force thereto, and causes said braking means to be moved from said first position to said second position.

2. A recorder according to claim 1, wherein said first and second drive means comprises wheels having drive surfaces adapted for frictional engagement, the first drive wheel being secured to said drive shaft and said second drive wheel being rotatably mounted on said linkage means to provide a movable idler wheel for coupling rotary motion between the first drive wheel and a selected one of the turntables.

3. A recorder according to claim 1 wherein said linkage means comprises a plate-like member having an opening therethrough for mounting said member on said drive shaft and having an extended portion at which said second drive means is pivotally supported.

4. A recorder according to claim 3, wherein said clutch means comprises at least one planar member secured to said first drive means and adapted for rotation therewith, having a drive surface opposing said plate-like member and being mechanically biased thereagainst to couple rotary motion thereto.

5. A recorder according to claim 1, wherein said linkage means includes a pivotable projecting tab adapted to couple with said braking means to cause said movement thereof.

6. A recorder according to claim 1, wherein said braking means comprises supply and takeup turntable brake members, respectively, each of which is pivotally mounted adjacent a corresponding turntable and has a projecting section adapted to bear thereagainst, said brake member further having opposing sections adapted to mate with each other for coupling motion imparted one to the other.

7. A recorder according to claim 6, wherein said braking means further comprises means adapted to mate with a corresponding portion of a movably mounted carriage upon which are positioned appropriate transducers for recording and playback such that when said carriage is moved into a record or play mode, said braking means is correspondingly moved to allow rotation of said turntables.

8. A recorder according to claim 1 wherein said braking means further comprises means for biasing said braking means into said first position such that upon deenergization of said drive shaft, said means for moving said braking means causes said linkage means to return to a center position at which said second drive means is not coupled to either turntable.

9. A recorder according to claim 1, wherein said mechanism further includes an electrically reversible motor coupled to said drive shaft.

* * * * *